Patented Jan. 20, 1925.

1,523,982

UNITED STATES PATENT OFFICE.

HENRY HICKS HURT, OF YONKERS, NEW YORK, ASSIGNOR TO ROBESON PROCESS COMPANY, OF NEW YORK, N. Y., A CORPORATION OF NEW JERSEY.

TANNING.

No Drawing.    Application filed April 26, 1922. Serial No. 556,766.

*To all whom it may concern:*

Be it known that I, HENRY HICKS HURT, a citizen of the United States, residing at Yonkers, in the county of Westchester and State of New York, have invented certain new and useful Improvements in Tanning, of which the following is a specification.

This invention relates to tanning; and it comprises a method of tanning hides wherein such hides are treated with an acid sulfite waste liquor preparation containing free lignosulfonic acids and also containing magnesium lignosulfonates and with aluminum sulfate; and it also comprises as a new tanning preparation a liquid containing free lignosulfonic acids, magnesium lignosulfonates and aluminum sulfate; all as more fully hereinafter set forth and as claimed.

Sulfite waste liquor represents the part of the wood dissolved away from the cellulose in the sulfite process of making paper pulp. It contains, in addition to compounds derived from the "lignone" components of the wood, various tannins, extractives and water soluble bodies contained in the wood. The "lignone" is contained in the solution in the form of complex organic compounds formed at the expense of the original bisulfite; these bodies being called, for the sake of a name, lignosulfonates. The lignosulfonic acids have tanning properties and this fact is utilized in the preparation of many tanning compositions or "extracts." Since the free acids have greater tanning properties than their compounds, one tanning composition much used in the art is prepared by taking a concentrated waste sulfite liquor containing both lime and magnesia as bases and adding sufficient sulfuric acid and sodium bisulfate to precipitate the lime as calcium sulfate. This results in an acid liquor which is usually marketed at about 30° B.; the acidity being due to various free acids and among them, lignosulfonic acids. Magnesium lignosulfonates are also present. The lignosulfonic acids, or some of them, are bodies of strongly acid properties and in the described operation care is taken not to add more than sufficient sulfuric acid to combine with the lime. By adding merely a small amount the added sulfuric acid is all carried down in combination with lime as calcium sulfate in the precipitate and the clear liquid resulting contains no sulfuric acid in the free state.

In another type of tanning composition made from waste sulfite liquor no effort is made to secure free lignosulfonic acids; the lignosulfonic acids being utilized in a state of combination in the form of their alumina compounds. Materials of this kind are made by precipitating sulfite waste liquor with a solution of sulfate of alumina in the amount corresponding to the lime present. This results in a composition containing lignosulfonate of alumina and lignosulfonate of magnesia; the lime being thrown down as insoluble calcium sulfate. In this composition, both the alumina and the lignosulfonic acid with which it is combined are tanning agents; both contribute to the formation of leather from hide.

I have found that a useful type of tanning composition may be made on somewhat different principles. In practicing this invention I preliminarily treat commercial concentrated sulfite waste liquor with sulfuric acid or sulfuric acid and sodium bisulfate (niter cake) as before, in the proportions to combine with the lime present and to precipitate it as calcium sulfate. This precipitation results in a freely acid lime-free liquor, the acidity, however, not being due to the presence of free sulfuric acid. The acidity, apart from some free acetic and other weak free organic acids which may be present, is due mainly to lignosulfonic acids. As stated, these have tanning properties. To the composition thus produced, I add aluminum sulfate. This should be free of iron. It may be added in the form of pulverulent material or dissolved in water. I usually take a concentrated waste sulfite liquor of such specific gravity that after the addition of the aluminum sulfate the resultant product shall have a density of 30° B., which is a standard strength for commercial products of this kind. The resultant liquid contains free lignosulfonic acids (as well as free tannic acid, acetic acid, etc.) magnesium lignosulfonates and aluminum sulfate. Free sulfuric acid is substantially absent. In use on the hide, the free lignosulfonic acid exerts its tanning influence on the hide and there is a double decomposition by which the lignosulfonic acid combined with the magnesia and the alumina of the sulfate of alumina also exert a tanning action. Magnesium sulfate is formed and remains in the solution and this has an advantageous action. I often, although not necessarily, add a little additional magnesium sulfate to the bath.

Instead of combining the aluminum sulfate with the acidified sulfite waste liquor as a single bath, they may be used successively, in what may be called a 2-bath process. In so doing, the hide is first exposed to an acidified sulfite waste liquor tanning extract, which is, as stated, a commercial preparation, and is thereafter exposed to the action of a solution of sulfate of alumina. Or the order of procedure may be reversed, the hide being first exposed to the action of sulfate of alumina and then to that of the acid sulfite waste liquor.

In a typical embodiment of the present invention, using a single-bath tanning, the bath may be given a density of about 50° "barkometer", or 1.050 sp. g. In making such a bath I may use the stated materials in about the proportion of 1500 parts by weight of acidulated waste sulfite liquor of 30° Baumé and 50 parts of commercial aluminum sulfate. To this may be advantageously added 40 parts of sugar and 15 parts of magnesium sulfate. Advantageously the tanning temperature is around 150° F. In an hour's treatment the hide may increase in weight 15 per cent.

What I claim is:

1. In tanning, the process which comprises exposing hide to the action of aluminum sulfate and a lime-free sulfite waste liquor preparation containing free lignosulfonic acids and magnesium lignosulfonate.

2. In tanning, the process which comprises exposing hide to the action of aluminum sulfate and a lime-free sulfite waste liquor preparation containing free lignosulfonic acids and magnesium lignosulfonate in a single bath.

3. As a new tanning composition, a liquid of about 30° Baumé density containing free lignosulfonic acids, magnesium lignosulfonate and aluminum sulfate, said liquid being practically free of lime.

In testimony whereof, I have hereunto affixed my signature.

HENRY HICKS HURT.